United States Patent [19]

Wendt et al.

[11] Patent Number: 4,570,378

[45] Date of Patent: Feb. 18, 1986

[54] METHOD OF PROMOTING SEEDLING EMERGENCE OF FIELD-PLANTED, SMALL-SEEDED CROPS

[75] Inventors: Charles W. Wendt, Lubbock, Tex.; Joseph D. Shroder, Reedville, Va.; Michael D. Gerst, Lubbock, Tex.

[73] Assignee: Fats and Proteins Research Foundation, Inc., Des Plaines, Ill.

[21] Appl. No.: 629,508

[22] Filed: Jul. 10, 1984

[51] Int. Cl.$^4$ ............................................. A01G 7/00
[52] U.S. Cl. .............................................. 47/9; 111/1
[58] Field of Search ....................... 47/9; 111/DIG. 1

[56] References Cited

U.S. PATENT DOCUMENTS

| | | | |
|---|---|---|---|
| 3,281,987 | 11/1966 | Scott | 47/9 |
| 3,308,578 | 3/1967 | Karcher et al. | 47/9 |
| 3,320,696 | 5/1967 | Wright et al. | 47/9 |
| 3,330,070 | 7/1967 | Ferm et al. | 47/9 |
| 3,387,405 | 6/1968 | Iwasyk et al. | 47/9 |
| 4,208,973 | 6/1980 | Baer et al. | 47/9 X |

OTHER PUBLICATIONS

Webster's Third New Intl. Dictionary, 1963, G.&C. Merriam Co., Springfield, Mass., p. 2160.

*Primary Examiner*—Robert E. Bagwill
*Attorney, Agent, or Firm*—John S. Fosse

[57] ABSTRACT

A method of promoting the emergence of field-planted, small-seeded crops comprises sowing the seeds in an agricultural field and applying an emulsion which includes an animal fat material to the soil directly over the sown seeds.

6 Claims, No Drawings

4,570,378

METHOD OF PROMOTING SEEDLING EMERGENCE OF FIELD-PLANTED, SMALL-SEEDED CROPS

FIELD OF THE INVENTION

This invention relates generally to the agricultural arts and relates more particularly to cultural practices attendant on the raising of small-seeded crops such as onions and peppers.

BACKGROUND OF THE INVENTION

Small-seeded crops are not ordinarily planted in agricultural fields as seed because of historically poor stand development. Instead, these crops are commonly sprouted in greenhouses and later transferred to the field as seedling plants. Transplanting costs are frequently substantial and may range from $400 to $600 per acre.

Poor stand development of small-seeded crops is principally the result of one or a combination of two factors, namely: (1) inadequate or insufficiently uniform levels of soil moisture in the planting zone for successful germination, emergence and seedling growth; and (2) crusting of the soil surface layer which physically inhibits seedling emergence.

SUMMARY OF THE INVENTION

The present invention provides an innovative, inexpensive cultural practice which ensures a good stand development of field-planted, small-seeded crops. Specifically, the present invention contemplates the application of a suitable quantity of an animal fat emulsion onto the soil directly over the zone in which the seeds have been sown. This emulsion advantageously comprises an ammonium soap of Yellow Grease, for example, and is usefully applied by the spraying of a water-diluted formulation. Sown and treated seed blocks located in West Texas, compared with adjacent, sown but untreated blocks, showed 7-12 days earlier seedling emergence and as much as an eightfold increase in seedling populations. In addition, comparative measurements of soil surface strength have indicated that a reduction in the crust strength results from the treatment.

DETAILED DESCRIPTION OF THE INVENTION

The cultural practice of the present invention comprises a simple application of an animal fat based emulsion onto the field soil directly over the sown seed. Drilling of the seed and spray-application of the emulsion may economically be accomplished in a single equipment-pass over the pre-prepared field; and application of the emulsion in a 4-to 8-inch wide band spanning the drill optimizes the benefits of the treatment. Application of the emulsion at a rate of at least about 200 pounds of solids per acre also promotes good results.

The animal fat based emulsion of the invention may be prepared by the use of synthetic surfactants or by saponification of the animal fat material with a suitable alkali.

When the animal fat emulsions of the invention are prepared using a synthetic surfactant, a concentrate is initially formed to be stored and shipped as such and diluted on-site with water for field application, if desired. In formulating the emulsified concentrates of the invention, a surfactant or mixture of surfactants is selected to exhibit the required hydrophile-lipophile balance, and a quantity of an animal fat material, such as beef tallow, is melted and stirred in a jacketed kettle or similar vessel until a completely liquified state is stabilized at an appropriate temperature, for example 45° C.

The surface active ingredient, in its commercially received state, is then added to the molten fat and blended to a uniform mixture. Thereafter, water, suitably softened if necessary and heated to the temperature of the liquified fat, is introduced in continuation of stirring until the mixture thickens forming a water-in-oil emulsion. When approximately three-quarters of the water has been added, the mixture converts to an oil-in-water emulsion as indicated by a decrease in viscosity. Next, the remaining water fraction is rapidly incorporated with agitation; and the resultant composition is quickly cooled to a suitable temperature of about 25° C. At this point, the product is ready for either use or packaging and storage.

The particular level of surfactant is not critical in the practice of the present invention; and from about 5% to about 15% surfactant in the emulsified concentrate has proved both effective and economical.

In compliance with features of the invention, the selected animal fat material is a mixture of monoglycerides, diglycerides and triglycerides in which mixture there is present a quantity of one or more fatty acids in the free or uncombined state; and specific fatty substances which have proved useful in the practice of the invention include products containing inedible animal body fats such as Choice White Grease, No. 1 Dark Tallow, No. 2 Dark Tallow, Yellow Grease and Bleachable Fancy Tallow. Tallow fatty acids may be added under some circumstances in an amount on the order of as much as about 10-20% by weight.

The animal fat material is included in the instant emulsions at a level of from about 20% to about 60% by weight, optimized in a range of from about 25% to about 55% by weight.

Water serves as a convenient vehicle and diluent in the practice of the invention; and a water supply with a low content of dissolved minerals is generally desired.

When it is desired to formulate the instant emulsions as soap, a typical formulation may include the following ingredients:

| FORMULA A | |
|---|---|
| 33.62 kg | Yellow Grease |
| 3.46 kg | Undistilled Tallow Fatty Acids |
| 1.34 kg | Ammonium hydroxide (29% NH3) |
| 74. g | Butylated hydroxytoluene (BHT) |
| 74. g | Citric acid, anhydrous |
| 74. g | Methyl Paraben |
| 74. g | Propyl Paraben |
| 61.52 kg | Water (preferably deionized) |
| 100.1 kg (about 29 gals.) | |

In order to enhance the understanding of the invention, the following working examples are given without, however, intending to limit the invention to all of the details set forth.

A study was conducted at Lubbock, Texas, on an Olton clay loam soil (fine, mixed, thermic Ardic Paleustolls). The field had been plowed, disced and listed in mid-February, and weeds were controlled by periodic hand cultivation.

The field design for both onions and peppers was a randomized complete block with four replications. A control variable of bare soil was included. In separate trials, onion (Ferry Morse "Ringmaster") and pepper (Ferry Morse "Grande Rio 66") seeds were planted in ten foot rows (two rows per 20 inch bed) at a depth of 0.75 inches. A total of 60 seeds were planted in each row. Copper-constantan thermocouples were installed at 0.75 inches in each plot of the onion trial and were monitored at one hour intervals by a Doric Scientific Model 210 datalogger. Soil temperatures were obtained for a period of 14 days between planting and emergence. Rainfall was measured using a Campbell Scientific Model CR21 Weather Station. Rainfall was also measured using a Weathertronic Recording Raingage accurate to 0.01 inch. Tensiometers (Irrometer Corporation) were installed at a depth of six inches (crop root depth) in each plot of both the onion and pepper trials. Irrigations were scheduled when the average value of all four tensiometers in each treatment was equal to or greater than 30 cbars of suction. This limit was selected because most of the water that is ordinarily available to plants in the Olton clay loam soil falls in the 0–30 cbar range.

Irrigations were applied using a drip irrigation system specifically designed for the study. With this drip system, each treatment could be irrigated independently of the other treatments. Irrigations were applied in increments of 1.2 inches, the amount of water required to return the top twelve inches of soil to field capacity after drying to −30 cbars. Dates and amounts were recorded for each irrigation. A pre-plant irrigation (onions—three inches; peppers—two inches) was applied to all treatments to insure sufficient soil moisture for seed germination.

Immediately after planting on March 4, the animal fat emulsion (Formula A) was diluted with water (Table 1) and sprayed evenly on the soil directly over the seed row in band widths of two, four and eight inches using a hand sprayer. In the pepper study, less water (one-half than in the onion study) was used to dilute the emulsion for spraying. The control plots were sprayed with water only. A portable border was used to insure that the emulsion remained within the desired band width. Although the actual amount of emulsified animal fat sprayed on the soil surface per length of row varied as a result of the width of the spray band, the rate of emulsion per unit of treated soil area was the same for all treatments. A rate of 1143 lbs/A was employed. The onion trial was harvested on July 28 and the yield of bulbs was determined by bulb size. Pepper yields were measured on September 1.

TABLE 1

| Treatment | Emulsion Band Width | Rate of Application (lbs/A) Emulsion | Rate of Application (lbs/A) Solids Only | Water Dilution (gal/A) |
|---|---|---|---|---|
| Bare Soil | None | None | None | 2715[1] |
| Emulsified Animal Fat | 2 | 286 | 100 | 2715 |
| Emulsified Animal Fat | 4 | 572 | 200 | 2715 |
| Emulsified Animal Fat | 8 | 1143 | 400 | 2715 |

[1] The amount of water applied in the Pepper trial was one-half of the amount shown.

EXAMPLE I—ONIONS

Onions seedlings in the eight-inch band treatment were the first to emerge on March 14, eleven days after planting. They were followed by seedlings from the four-inch band treatment on March 16, the two-inch band treatment on March 18 and the control treatment of March 22. New seedlings continued to emerge in all treatments for a period of two-three weeks following the initial emergence. The onions in all animal fat treatments were the only green tender vegetation in the field. As a result, varmint damage was heavier on these treatments than on the control. Where the plants were grazed close to the surface, some estimate of damage was obtained. However, subsequent plant counts and field observations indicate some seedlings had been uprooted which made it difficult to accurately access varmint damage.

From early April until the onions were harvested on July 28, the number of onions in the four-inch band treatment were significantly greater than the control (Table 2). The numbers of onion seedlings in the eight-inch and two-inch band treatments were higher than the control but were generally not significantly greater than the control. Because this study was primarily an emergence evaluation study; a large number of seeds were planted. Normally, onions are planted at four-inch spacings. In this study the plant spacing was one every two inches and all treatments resulted in stands that were greater than normally planted.

TABLE 2

| Treatment | Onion Plant Populations (per 10 foot row) | | |
|---|---|---|---|
| | Mar 28 | May 10 | Jul 28 |
| Bare Soil | 38 | 31 | 32 |
| 2-inch band | 35 | 31 | 32 |
| 4-inch band | 45 | 39 | 42 |
| 8-inch band | 41 | 32 | 35 |

Soil temperature measurements followed the expected diurnal curve with minimum values (33–35 deg. F.) occurring at 6–7 a.m. and maximum values (80–83 deg. F.) occurring at two p.m. Soil temperatures in the seed zone were generally warmer during the day and cooler at night in the untreated plots than in the animal fat treated plots. Although some differences in soil temperature between treated and untreated plots were observed, the differences were not significant.

Irrigations were scheduled based on tensiometer data with the exception of the two pre-emergence irrigations. Low values (more negative) indicate a dryer soil with most of the plant available water held in the 0 to −30 cbar range. During March, the tensiometer data indicate the water content of the bare soil and four-inch band treatments were similar, while slightly more water was present in the two-inch and eight-inch band treatments. Beginning in April, the onions began to use more water as indicated by the decrease in the tensiometer data resulting in more frequent irrigations. After an irrigation, the tensiometer data increased rapidly and then began to decrease as the soil dried out. As the crop grew faster and matured during May and June, the data show rapid decreases in soil water content which required much more frequent irrigations. During this period potential evaporation increased from 0.2 to 0.4 inches/day. Because the onions were using water rapidly, the tensiometer data were often below −30 cbar. The data indicate that tensiometers at the 6" depth are not a good indicator on which to base irrigations during the growing season.

All treatments required two post-plant irrigations (2.5 inches total) prior to emergence. The total rainfall between planting and emergence was 0.03 inches and had little if any effect on emergence. Irrigations were scheduled based on tensiometer data with the bare soil and four-inch band treatments requiring approximately the same amount and number of irrigations. The eight-inch and two-inch band treatments required considerably less irrigation water than the bare soil or four-inch band treatments. The number of plants in the bare soil, two-inch and eight-inch band treatments were essentially the same during the study and much lower than the number of plants in the four-inch band treatment. It is speculated that the plants in the four-inch treatment used more water because of a higher plant population while the lower water use by the two-inch and eight-inch treatments was probably due to a lower plant population. Rainfall was 6.3 inches less than average for the February to July period. These data indicate the total water requirement (rainfall and irrigation) was less for the two-and eight-inch band treatments compared to the bare soil treatment for the same plant stand.

Total yield (Table 3) for the onions in the four-inch band treatment was significantly greater than control perhaps due to the greater number of surviving plants. The onions in the two-inch band yielded significantly less than the untreated plots which may have been due to receiving nine inches less irrigation water than untreated plots. Few differences were observed for the yield of selected sizes. The water use ratio which is an indicator of how much harvestable plant material is produced per unit of water was generally higher for the onions in the treated plots than the untreated plots. The onions in the four-inch band treatment had a significantly higher water use ratio than the untreated plots.

TABLE 3

Yield (lbs/A) and water use ratio (lbs/acre-inch of water) in the Onion Emergence Study at Lubbock, Texas

| Treatment | <2 | 2-2.5 | Size of Bulb (inches) 2.5-3 | 3-3.5 | 3.5-4 | Total | Water Use Ratio |
|---|---|---|---|---|---|---|---|
| Bare Soil | 810 a | 3097 a | 3973 a | 1019 a | 196 a | 9095 b | 353 a |
| 2-inch band | 1346 b | 2744 a | 2444 a | 666 a | 0 a | 7200 a | 431 ab |
| 4-inch band | 1581 b | 4182 a | 3947 a | 1202 a | 0 a | 10912 c | 444 b |
| 8-inch band | 732 a | 3345 a | 3973 a | 1150 a | 0 a | 9200 b | 418 a |

Values followed by different lower case letters are significantly different at $\alpha$ 0.10 using Duncan's Multiple Range Test statistic.

EXAMPLE II—PEPPERS

The pepper seedlings in the eight-inch band treatment emerged on May 15, twelve days after planting and were followed by the pepper seedlings in the two-and four-inch band treatments on May 16 and by the untreated plots on May 18. The pepper seedlings in the band treatments emerged two to three days earlier than the untreated plots. The total number of surviving pepper plants in the treated plots ranged from two to four times as many as in the untreated plots and were generally significantly greater than the untreated plots (Table 4).

Except for the pre-plant irrigation, irrigations were scheduled based on tensiometer data. The period from May through June was characterized by slow decreases in soil water potential after an irrigation. Beginning in July and August, the data show rapid decreases in soil water potential after an irrigation. During these months, the pepper plants were rapidly using water (potential evaporation range from 0.2 to 0.4 inches/day) and frequent irrigations (every two days) were required as the tensiometer readings were often below −30 cbars.

All treatments emerged without requiring a post-planting irrigation. The frequent rainfall during late May and early June resulted in few irrigations during this period. However, beginning in mid-June through August irrigations were much more frequent because of the lack of rain and the hot, dry weather. The eight-inch treatment required the most frequent irrigations which may have been due to water runoff due to treatment. The bare soil, two-inch and four-inch band treatments required about the same amount of irrigation. The rainfall total of 3.98 inches was approximately 7.0 inches less than the normal rainfall during April to August.

TABLE 4

| | Pepper Plant Populations (per 10 foot row) | |
|---|---|---|
| Treatment | May 24 | June 10 |
| Bare Soil | 8 | 10 |
| 2-inch band | 20 | 22 |
| 4-inch band | 30 | 29 |
| 8-inch band | 26 | 26 |

Total yield for all animal fat treatments (Table 5) of both red and green peppers was higher than the untreated plots. The yield of peppers in the four-inch band treatment was significantly greater than the untreated plots which was the same result found in the onion study of Example I. The water use ratio was greater for all treatments compared to untreated plots. The four-inch band treatment produced significantly more peppers per unit of water than the untreated plots.

TABLE 5

Yield (lbs/A) and water use ratio (lbs/acre-inch) in the Pepper Emergence Study at Lubbock, Texas

| Treatment | Total Yield | Water Use Ratio |
|---|---|---|
| Bare Soil | 2026 A[1] | 85 A |
| 2-inch band | 7331 AB | 294 AB |
| 4-inch band | 11683 B | 469 B |
| 8-inch band | 9161 AB | 336 AB |

[1]Values followed by a different upper case letter are significantly different at $\alpha$ = 0.05 using Duncan's Multiple Range Test Statistic.

EXAMPLE III—RATE OF APPLICATION OF ANIMAL FAT EMULSION

A study was conducted at Lubbock, Texas, on an Olton clay loam soil (fine, mixed, thermic Ardic Paleustolls). The field had been plowed, disced and listed in mid-May. Weeds were controlled by periodic spraying with "Paraquat" herbicide (1 pt a.i./A) and by hand hoeing. The field did not receive additional irrigation between mid-May and September.

The field design was a randomized block with four replications. The animal fat emulsion (Formula A) was applied at rates of 0, 286, 571 and 1143 lbs/A. Cotton seed was planted on September 4 without preliminary irrigation and at a depth of two inches. The animal fat emulsion was applied by hand pump sprayer immediately after planting each plot. The emulsion was sprayed in an 8-inch wide band centered directly above the seedbed. A portable wooden border was used to contain the emulsion to the 8-inch band. The border was removed fifteen minutes after spraying when the emulsion had stabilized on the soil surface.

Cotton emerged on September 9, five days after planting. The 1143 lbs/A emulsion treatment significantly increased emergence by September 10 (Table 6). Increased emergence was also observed for the 571 lbs/A treatment. No difference in emergence was observed between 286 lbs/A and control. Emergence was essentially complete by September 20, twelve days after planting.

TABLE 6

| Treatment | Cotton Plant Populations (Avg. No. of Plants) Days After Planting | | |
|---|---|---|---|
| | 10 | 17 | 24 |
| Bare Soil | 29 | 35 | 35 |
| 286 lbs/A Emulsion | 28 | 34 | 36 |
| 571 lbs/A Emulsion | 32 | 38 | 37 |
| 1143 lbs/A Emulsion | 40 | 42 | 42 |

When the first cotton plants emerged, soil water content (Table 7) was higher than the control for all emulsion treatments. Soil water content for the 1143 lbs/A treatment was significantly higher than the control. Soil surface strength on September 7 (three days after planting) and September 10 (date of first emergence) were significantly lower than the controls for both the 571 and 1143 lbs/A treatments. The soil water data and soil strength data indicate that the emulsion treatments increased emergence by both conserving water and decreasing crust strength.

TABLE 7

| Soil water content and surface soil strength for cotton plots | | | |
|---|---|---|---|
| Emulsion Treatment (lbs/A) | Percent by weight Water on 9/10 | Soil Surface Strength[2] lbs/in$^2$ | |
| | | 9/7 | 9/10 |
| 0 | 8.1 A[1] | 132.7 B | 132.7 B |
| 286 | 8.9 A | 111.9 B | 54.7 A |
| 571 | 9.3 A | 37.7 A | 34.0 A |
| 1143 | 11.6 B | 44.0 A | 30.2 A |

[1]Values followed by a different letter are significantly different at P = 0.05 using Duncan's Multiple Range Test.
[2]Planted September 4 and emerged first on September 10.

The specific examples herein described are to be considered as primarily illustrative. Various changes will no doubt occur to those skilled in the art; and such changes are to be understood as forming a part of this invention insofar as they fall within the spriit and scope of the appended claims.

The invention is claimed as follows:

1. The method of reducing soil surface strength and promoting the emergence of field-planted, small-seeded crops which comprises the steps of sowing seeds in an agricultural field; and applying an emulsion which includes a relatively water-soluble ammonium soap of an animal fat material to the soil directly over the sown seeds, said emulsion being applied at a rate of at least about 200 pounds of solids per acre.

2. The method according to claim 1 wherein said emulsion is applied by spraying.

3. The method according to claim 1 wherein said seeds are sown in a drill and wherein said emulsion is applied in a band over said drill.

4. The method according to claim 3 wherein the width of said band is about 4 inches.

5. The method according to claim 1 wherein said animal fat material is Yellow Grease.

6. The method according to claim 1 wherein said animal fat material is tallow.

* * * * *